July 18, 1933. W. LEHMANN 1,919,113

LUBRICATING MEANS FOR AXLE BEARINGS OF VEHICLES

Filed Oct. 26, 1932

W. Lehmann
Inventor

By Marks&Clerk
Attys.

Patented July 18, 1933

1,919,113

UNITED STATES PATENT OFFICE

WALTER LEHMANN, OF WUPPERTAL-ELBERFELD, GERMANY, ASSIGNOR TO WALTER PEYINGHAUS, OF EGGE, NEAR VOLMARSTEIN, RUHR, GERMANY

LUBRICATING MEANS FOR AXLE BEARINGS OF VEHICLES

Application filed October 26, 1932, Serial No. 639,712, and in Germany February 20, 1931.

It is known to lubricate axle bearings from above by means of an oil-carrying disc, which rotates in an upwardly radially tapered groove and causes the oil to collect just before its highest point, whence it is forced laterally through ducts to the point to be lubricated. In this method, the oil bath forms a furrow, at high speeds, similar to the wake of a ship, so that the oil is no longer in contact with the sides of the rotating disc. On the other hand, at low speeds, the oil carried by the disc is simply scraped off before the inlet of the side duct and runs down the wall of the casing, back into the oil bath, without being utilized, viz., without being caused to collect and produce a pressure which would force it to enter the side duct and run towards the point to be lubricated.

It will thus be seen that in the known method of conveying the oil, the lubrication of the bearing cannot take place immediately after the starting, since the disc has first to be rotated until it reaches a certain speed at which oil can be forced into and along the delivery duct. But in the meantime the bearing may have run hot.

The object of the present invention is to avoid the drawbacks above referred to.

The lubricating means according to this invention consists of a rotary disc which may comprise a ring provided with segments, arranged to pass, during its rotation, through an oil-conveying groove which gradually decreases axially in the direction of rotation until it is equal to the gap which is just sufficient to allow the oil-carrying disc to rotate through it, the said tapering of the groove extending up to the connection of the oil ducts which lie directly in front of the highest point of the disc and lead to the points of lubrication.

The oil-conveying groove is open at its lower end and is formed between the collar of the bearing brass and a member connected to the said collar and secured in position by a projection and it may form part of the cover of the axle box casing.

The accompanying drawing illustrates, by way of example, one mode of carrying the invention into effect.

Figure 1:
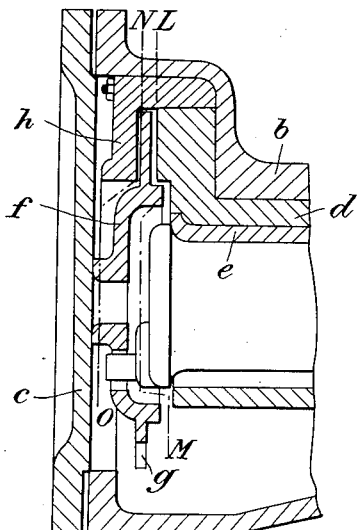
Fig. 1 is a longitudinal section through the middle of the axle bearing.
Figure 2:
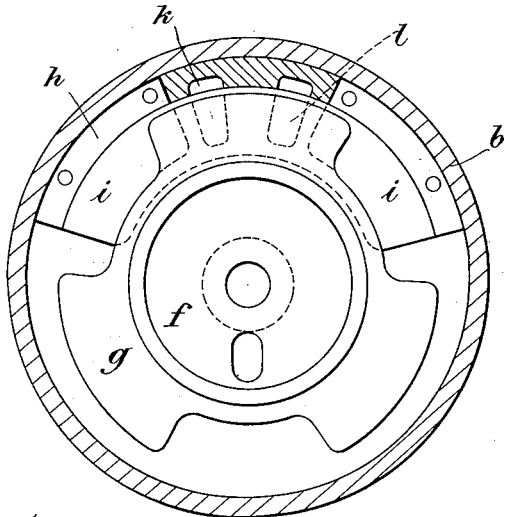
Fig. 2 is a cross-section along the line L—M in Fig. 1 seen in the direction of the cover.
Figure 3:
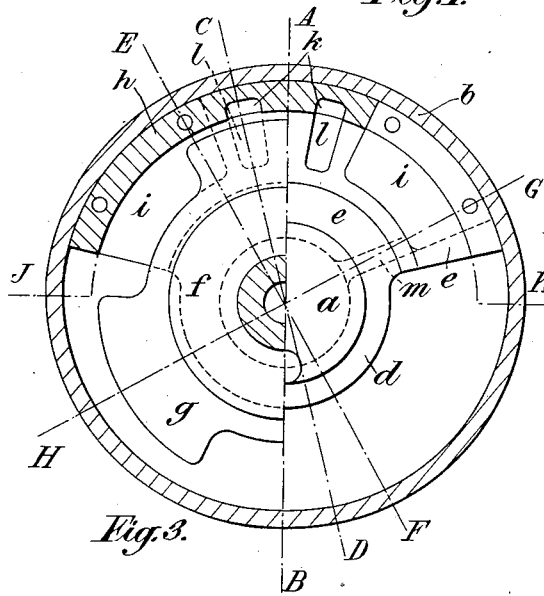
Fig. 3 illustrates on the right-hand side, the same cross-section as shown in Fig. 2 but looking in the opposite direction and on the left-hand side a cross-section along the line N—O in Fig. 1.
Figures 4, 5:
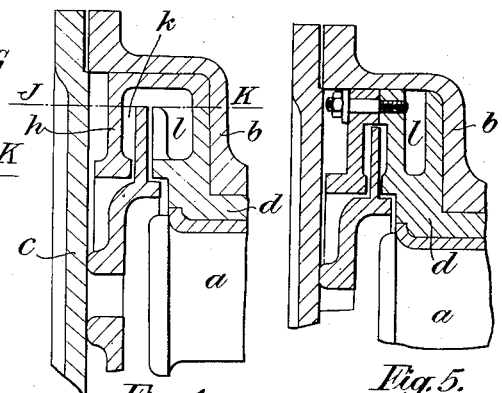
Fig. 4 is a cross-section along the line C—D in Fig. 3.
Fig. 5 is a cross-section along the line E—F in Fig. 3.
Figure 7:
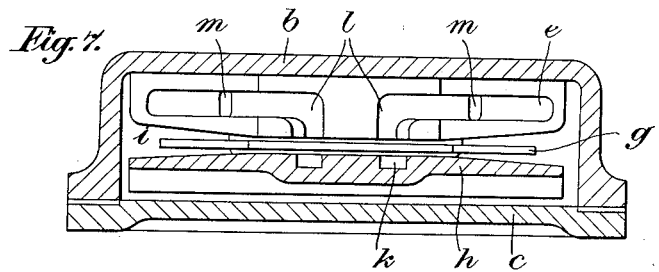
Fig. 7 is a longitudinal section along the line J—K in Fig. 4.
Figure 6:
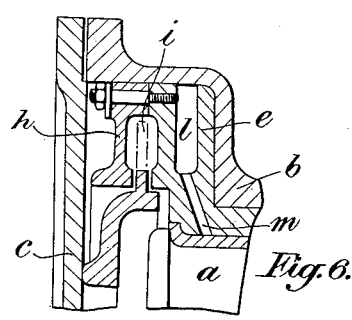
Fig. 6 is a cross-section along the line G—H in Fig. 3.

In the drawing, $a$ is the axle, $b$ the axle-box casing, $c$ the cover of the casing, $d$ the bearing brass, $e$ the collar formed on the latter, $f$ the segment-supporting ring of the oil-carrying disc, $g$ the segments of the latter, $h$ the member which limits the oil-conveying groove on the one side and which is screwed on in front of the bearing brass collar, $i$ the tapering groove which is formed between the said collar and the said member, $k$ the overflow oil ducts formed in the member $h$, $l$ the oil ducts formed in the collar $e$ and $m$ are the collecting and delivery channels formed in the bearing brass and leading to the points of lubrication.

The lubricating means hereinbefore described operate as follows:—

The oil which adheres to the segments of the oil-carrying disc, at all and more particularly at the critical speeds, penetrates into the tapering groove in the same manner as in the case of formation of an oil film in a thrust bearing, so that the pressure of the oil is continuously increased in the groove up to the highest point of the disc, which pressure forces the oil just before the highest point laterally into the oil delivery channels of the bearing brass. In this way also the oil which tends at high speeds to fly away just before it reaches the highest point is utilized for the production of the pressure in the gap and at low speeds an efficient oil-delivery up to the points of lubrication is effected immediately on starting. In addition thereto, the critical speed which occurs with centrifugal lubrication, at which speed the oil is neither thrown off nor drips, is avoided in the construction according to the present invention. Further, the indiscriminate splashing of the oil which, in the case of centrifugal lubrication is the real reason of emulsification and formation of froth is avoided because, immediately upon the oil leaving the oil bath, the oil is sucked into the groove and is thus positively set in motion.

The construction according to the present invention is therefore especially suitable for high speeds up to 150 kilometres per hour.

What I claim is:—

1. An axle bearing having means for lubricating it and comprising in combination an axle bearing brass, an axle box casing, a rotary oil-carrying disc consisting of a central part and projecting segments thereon, a collar attached to the bearing brass and a member attached to the said collar and forming therewith an oil-conveying groove which gradually decreases axially in the direction of rotation until it is equal to the gap which is just sufficient to allow the oil-carrying disc to rotate through it, the said tapering of the groove extending up to the connection of the oil ducts which lie directly in front of the highest point of the disc and lead to the points of lubrication, the said segments of the oil-carrying disc projecting into the said tapering oil-conveying groove.

2. Means for the lubrication of axle bearings through their upper portions, comprising an axle box casing, a bearing therein having a member on the bearing and partially covering the end thereof, the bearing and member being connected to form between them a tapering groove, a rotary disc revoluble in the groove, said bearing having ducts extending from the upper portion of the narrower part of said tapering groove, said disc being operative to raise the oil and force it from the wider to the narrower portions of the groove through said ducts and back to the bearing parts.

3. Lubricating mechanism for axle bearings comprising a bearing having a groove therein, an oil carrying disc rotatable through said groove, said groove gradually decreasing in a direction axial of the bearing and in the same direction as the rotation of said disc until the groove is just sufficient to allow the oil carrying disc to rotate through it, said bearing having therein an oil duct lying directly in front of the highest part of the disc and said duct leading to the point desired to be lubricated.

WALTER LEHMANN.